United States Patent [19]

Clarke

[11] Patent Number: 5,512,851
[45] Date of Patent: Apr. 30, 1996

[54] CIRCUIT SYNCHRONIZATION WHEN SWITCHING BETWEEN MULTIPLE CLOCK SIGNALS USING A VARIABLE ADVANCE CONTROLLER

[75] Inventor: Keith S. P. Clarke, Cambridge, United Kingdom

[73] Assignee: Advanced RISC Machines Limited, Cambridge, United Kingdom

[21] Appl. No.: 414,623

[22] Filed: Mar. 31, 1995

[30] Foreign Application Priority Data

Oct. 27, 1994 [GB] United Kingdom ............... 9421661

[51] Int. Cl.⁶ .................................................. H03L 7/00
[52] U.S. Cl. .................. 327/144; 327/145; 327/152; 327/151; 375/362; 375/371
[58] Field of Search ............................ 327/141, 144, 327/145, 151–154; 375/106, 110, 111, 362, 371

[56] References Cited

U.S. PATENT DOCUMENTS 4,970,418  11/1990  Masterson ........................ 327/141
5,012,138   4/1991  Suzuki ............................. 327/141
5,144,170   9/1992  Parker ............................. 327/141

FOREIGN PATENT DOCUMENTS

0209313A2  7/1986  European Pat. Off. ........ H03K 21/18

Primary Examiner—Timothy P. Callahan
Assistant Examiner—Kenneth B. Wells
Attorney, Agent, or Firm—Albert C. Smith

[57] ABSTRACT

A data processing system having a first circuit and a second circuit that together control a third circuit by a respective first control signal and a second control signal. The first circuit issues a request signal to the second circuit to trigger initiation of the operation of the third circuit and the second circuit returns a grant signal to the first circuit to indicate that operation of the third circuit has completed. An advance controller within the second circuit serves to start to synchronize the grant signal back to the clock signal of the first circuit at one of a plurality of possible times that is selected to match the relative frequencies of the clock signals driving the first circuit and the second circuit.

12 Claims, 3 Drawing Sheets

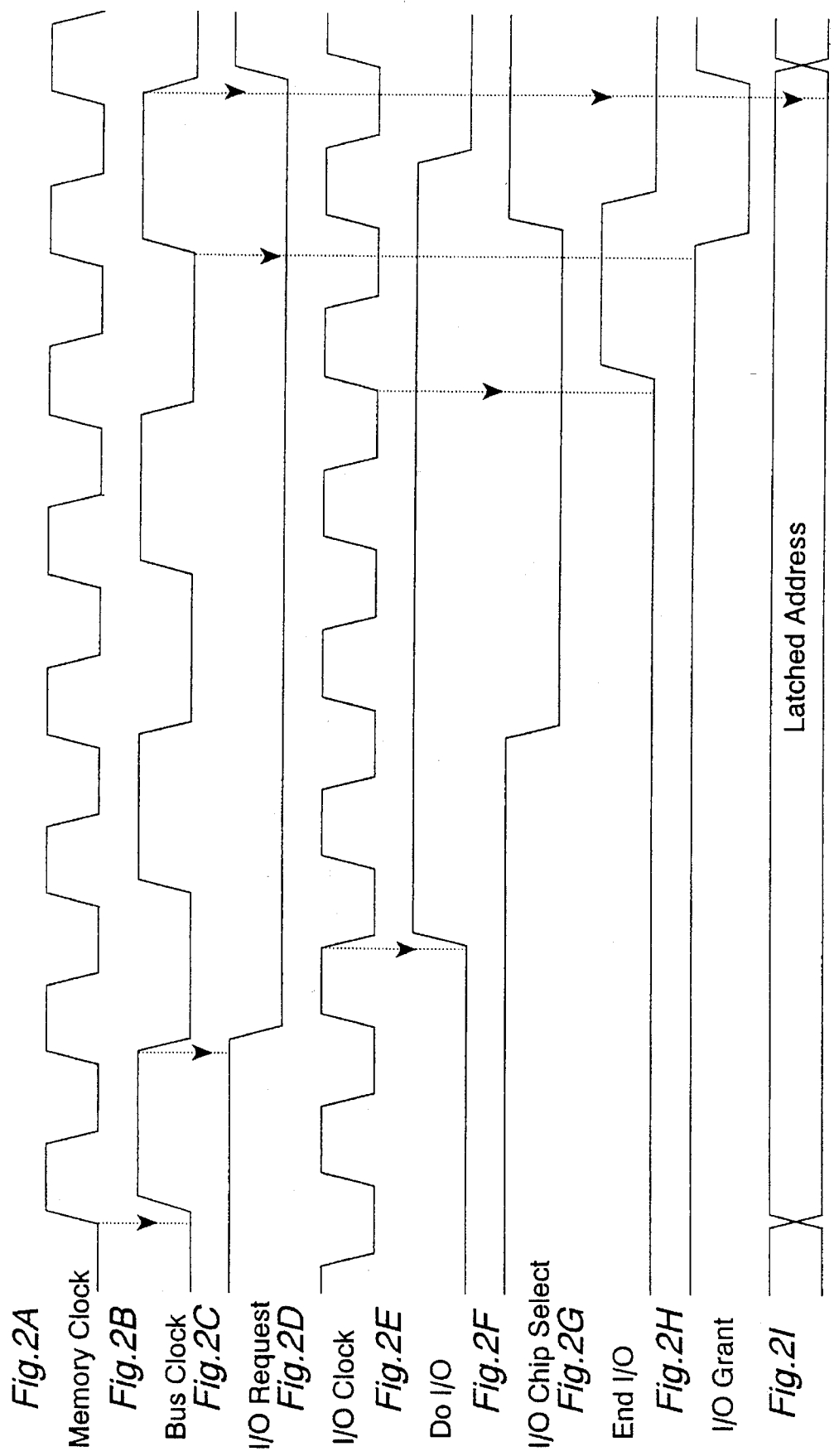

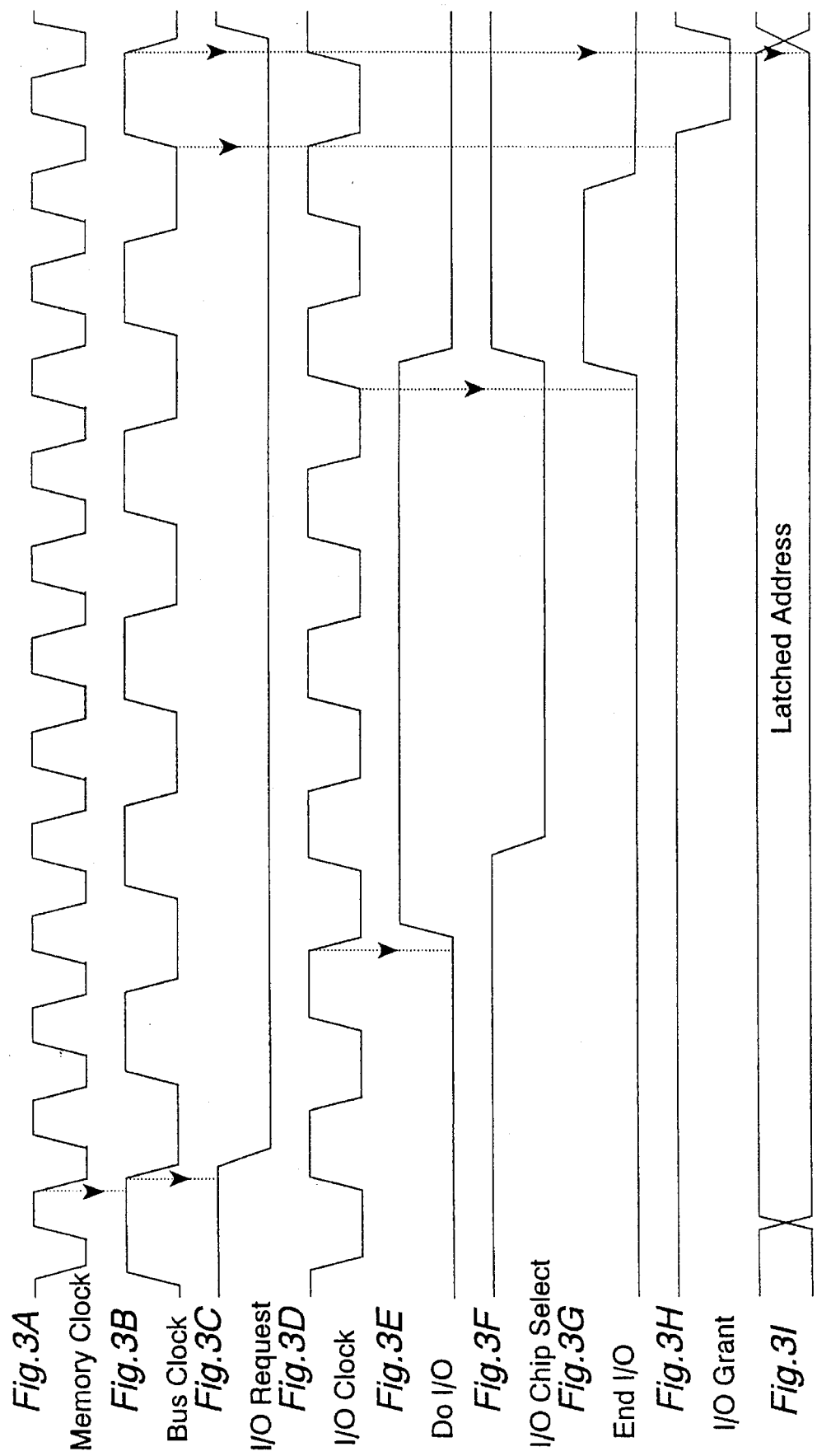

CIRCUIT SYNCHRONIZATION WHEN SWITCHING BETWEEN MULTIPLE CLOCK SIGNALS USING A VARIABLE ADVANCE CONTROLLER

BACKGROUND OF THE INVENTION

1. Field of the Invention

This invention relates to the field of data processing. More particularly, this invention relates to data processing systems having a first circuit driven by a first clock signal and a second circuit driven by a second clock signal, the first circuit and the second circuit together controlling the action of a third circuit.

2. Description of the Prior Art

It is known to provide a data processing system utilising more than one clock signal (e.g. a memory clock signal and an input/output clock signal) to control different circuits within the system. A situation which arises within such systems is that in which a first circuit driven by a first clock signal and a second circuit driven by a second clock signal co-operate to together control a third circuit. A typical circumstance of this would be the control of an input/output device, such as a disc controller, by the combined action of a bus controller operating at the bus clock speed and an input/output controller operating at the input/output clock speed. In this situation, the bus controller asserts an address upon the address bus and issues a request signal to the input/output controller to trigger the input/output controller to select the appropriate input/output device to perform the necessary operation. The input/output controller synchronizes the request signal to its own input/output clock signal and then issues the required control signals to the input/output device in synchronism with the input/output clock signal. When the required operation is completed, a grant signal is sent back to the bus controller, the grant signal first being synchronized back to the bus clock signal.

A constant aim within data processing systems is that their speed of operation should be as high as possible. Measures that increase the speed of operation are accordingly highly advantageous.

SUMMARY OF THE INVENTION

Viewed from one aspect the invention provides apparatus for processing data, said apparatus comprising:

(i) a first circuit driven by a first clock signal and operating to generate a first control signal and a request signal;

(ii) a second circuit driven by a second clock signal and operating to generate a second control signal and a grant signal, said second clock signal being independent of said first clock signal; and (iii) a third circuit operating under control of said first control signal and said second control signal, said request signal being supplied to said second circuit to trigger said second circuit to initiate operation of said third circuit using said second control signal and said grant signal being supplied to said first circuit to indicate that operation of said third circuit is complete and said first circuit need not maintain said first control signal;

(iv) a first synchronizing means for receiving said request signal from said first circuit and syncnronizing said request signal to said second clock signal prior to passing said request signal to said second circuit;

(v) a second synchronizing means for receiving said grant signal from said second circuit and synchronizing said grant signal to said first clock signal prior to passing said grant signal to said first circuit; and (vi) an advance controller coupled to said second circuit and serving to select one of a plurality of possible times in advance of completion of operation of said third circuit at which said second circuit passes said grant signal to said second synchronizing means for synchronization to said first clock signal.

The invention recognises the problem that an undesirable delay may occur once the third circuit has completed its operation whilst the second circuit and second synchronizing means serve to generate the grant signal and synchronize this back to the first clock signal. In order to address this problem an advance controller is provided that allows the second circuit to generate the grant signal in a controlled manner before the third circuit has actually completed its operation so that the synchronization process may start early and the synchronized grant signal is available with a reduced delay after the third circuit has actually completed its operation. The advance controller effectively cheats in that the grant signal starts to be generated before the event to which it relates (i.e. the completion of operation of the third circuit) has actually occurred.

Whilst the above described action of the advance controller serves to reduce the delay in synchronization back to the first clock signal, it can itself result in problems in the operation of the system. The invention further recognises and solves these problems. Given that the first clock signal and the second clock signal are independent of one another, it may be that the first clock signal has a higher frequency than the second clock signal. In this circumstance, re-synchronization back to the first clock signal (by finding an appropriate phase within the first clock signal) can occur sufficiently rapidly that the grant signal may be issued to the first circuit prior to the third circuit having actually completed its operation. In this situation, the first circuit may fail to maintain the first control signal for the full period that it is required by the third circuit since the first circuit has received the grant signal indicating that the third circuit has already completed its operation. In order to deal with this problem, the advance controller operates with a selectable one of a plurality of possible times in advance of completion of operation of the third circuit. In this way, the time in advance may be selected to suit the frequency of the first clock signal relative to the frequency of the second clock signal.

This feature has the further advantage that should the first clock signal frequency be changed, the system need not be significantly modified or re-designed, with only a different selection of time being necessary in the advance controller in order to avoid undue delay because of re-synchronization whilst avoiding the problem of the grant signal issuing too early.

Thus, when the first clock signal and the second clock signal have approximately the same frequency, the resynchronization can be achieved without undue delay and yet the system is able to cope with clock frequencies that are significantly different without attempting resynchronization too early.

It will be appreciated that the invention may be utilised when each of the circuit elements is embodied as discrete circuit components. However, the invention is particularly suited for use in systems in which said first circuit and said second circuit are formed as parts of a single integrated circuit.

When the first circuit and the second circuit are part of a single integrated circuit, then the ability to drive the first circuit with a first clock signal having a range of different first clock frequencies without having to re-design the circuit is particularly advantageous. For example, a single integrated circuit may be made to operate at many different first clock signal frequencies depending upon which other components are connected to it, such as fast DRAM vs slower memory systems.

The selection of advance time within the advance controller may be made with a hardware type switch, such as one or more dipswitches, connected to corresponding integrated circuit pins, but in preferred embodiments of the invention a central processing unit core circuit is used to set one or more advance control bits within an advance control register of the advance controller so as to select a particular one of the plurality of possible times.

In this way, the advance control bits may be set under software control so allowing considerable flexibility in the configuration of a system.

It will be appreciated that the third circuit may take many different forms each requiring control by a first circuit and a second circuit that operating with independent clock signals (e.g. with varying relative phase or frequency). However, in particularly preferred embodiments said third circuit is an input/output device driven by said second clock signal.

The need to control input/output devices having an independent clock signal frequently arises and in such circumstances it is desirable that the clock signal of the first circuit and the second circuit should not be unduly constrained by that of the input/output devices and yet undue delay for synchronization should be avoided.

In such situations, it is often the case that said second control signal is a chip selecting signal and said second clock signal is an input/output clock.

The invention is particularly useful when said first circuit a bus controller circuit, said first control signal is an address signal and said first clock signal is a bus clock signal.

It is important that the address signal should be asserted upon the address bus for the full time for which it is required and so the avoidance of the premature removal of the address signal during resynchronization is particularly useful.

As previously mentioned, the first clock signal and the second clock signal may have different frequencies. However, the invention is particularly suited to embodiments in which the first clock signal has a higher frequency than the second clock signal so allowing an upgrade path for the apparatus whilst maintaining the second clock signal which may be constrained by the devices which utilise it.

As previously mentioned, the first clock signal may be varied in order to take advantage of the capabilities of a fourth circuit element that is driven by the first clock signal and may be upgraded. An example of this would be a random access memory circuit.

Viewed from another aspect, the invention provides a method of processing data, said method comprising the steps of:

(i) driving a first circuit with a first clock signal to generate a first control signal and a request signal;

(ii) driving a second circuit with a second clock signal to generate a second control signal and a grant signal, said second clock signal being independent of said first clock signal; and (iii) controlling a third circuit with said first control signal and said second control signal, said request signal being supplied to said second circuit to trigger said second circuit to initiate operation of said third circuit using said second control signal, and said grant signal being supplied to said first circuit to indicate that operation of said third circuit is complete and said first circuit need not maintain said first control signal;

(iv) receiving said request signal from said first circuit at a first synchronizing means and synchronizing said request signal to said second clock signal prior to passing said request signal to said second circuit;

(v) receiving said grant signal from said second circuit at a second synchronizing circuit and synchronizing said grant signal to said first clock signal prior to passing said grant signal to said first circuit; and (vi) selecting with an advance controller coupled to said second circuit one of a plurality of possible times in advance of completion of operation of said third circuit at which said second circuit passes said grant signal to said second synchronizing means for synchronization to said first clock signal.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 is a signal diagram illustrating the operation of the system of FIG. 1 when the memory clock signal is approximately the same frequency as the I/O clock signal; and FIG. 3 is a signal diagram illustrating the operation of the system of FIG. 1 when the memory clock signal has a significantly higher frequency than that of the I/O clock signal.

DESCRIPTION OF THE PREFERRED EMBODIMENTS

Figure 1:
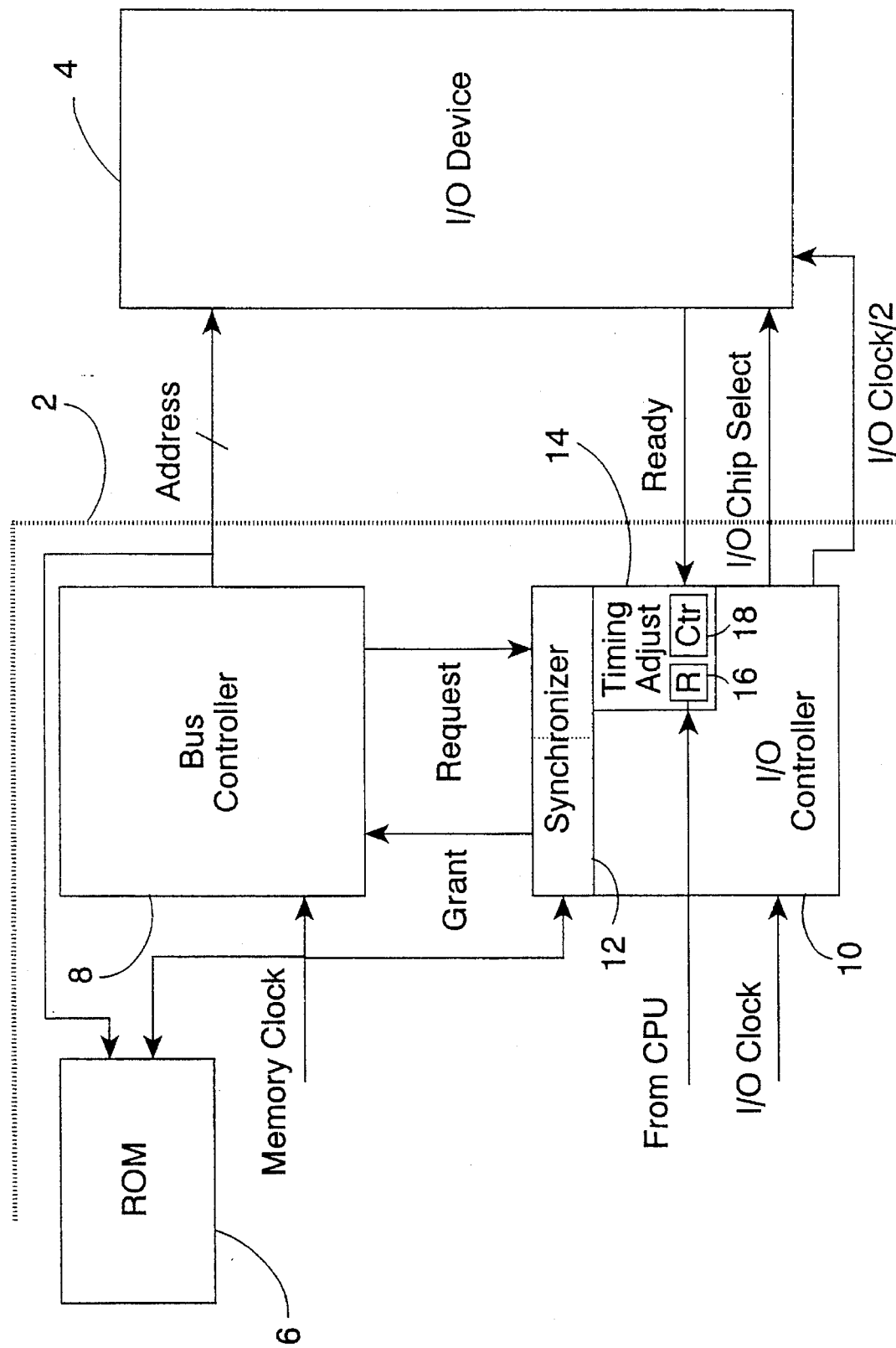
FIG. 1 illustrates a data processing system utilising multiple clock signals.

FIG. 1 shows an integrated circuit 2 connected to an I/O device 4, such as a disc drive controller. The I/O device 4 receives as control inputs an address signal and an I/O chip select signal. The I/O device 4 generates a ready signal that is supplied to the integrated circuit 2 and serves to indicate whether the I/O device 4 is stalled so requiring the I/O cycle to be extended.

The integrated circuit 2 incorporates a plurality of circuit elements including a central processing unit core, a read only memory circuit 6, a bus controller 8 and an I/O controller 10. A memory clock signal is supplied to the bus controller 8 (the memory clock is halved in frequency to form a bus clock which is used by the bus controller), the read only memory circuit 6 and the I/O controller 10. An I/O clock signal is supplied to the I/O controller 10 where it is divided by two to drive internal functions and also supplied to the I/O device 4 to drive its operation.

The I/O controller 10 includes a synchronizer 12 that has respective portions serving to synchronize:

(1) a request signal sent from the bus controller 8 to the I/O controller 10 to the I/O clock signal; and (2) a grant signal sent from the I/O controller 10 to the bus controller 8 to the bus clock signal.

An advance controller 14 within the I/O controller 10 and coupled to the synchronizer 12 serves to select one of a predetermined number of times in advance of the completion of operation of the I/O device 4 that the synchronizer 12 starts the process that results in the synchronization of the grant signal back to the bus clock signal.

The advance controller 14 includes an advance register 16 and a counter 18. The advance register 16 holds one or more advance control bits sent from a central processing unit core that specify which time period is to be selected. A counter 18 counts the number of clock cycles of the I/O clock signal that have occurred since the start of the I/O cycle and initiates the start of an End I/O signal that results in the synchronization of the grant signal back to the bus clock signal when a predetermined count has been reached. This predetermined count is selected in dependence upon the bits within the advance control register 16 and in this way a predetermined time in advance of completion of the operation of the I/O device 4 is selected. If the ready signal from the I/O device 4 indicated that the I/O device 4 is stalled, then the incrementing of the counter 18 is inhibited thereby extending the I/O cycle as appropriate.

The system illustrated in FIG. 1 can be considered to operate as follows. An output (or input) operation is to be performed to the I/O device 4 and accordingly an address signal is asserted to the I/O device 4 by the bus controller 8. This address signal specifies the address location to which the data to be output relates. The bus controller 8 then issues a request signal to the I/O controller 10 indicating that an I/O operation is required. The synchronizer 12 synchronizes this request signal to the I/O clock signal and then issues an I/O chip select signal to the appropriate I/O device (e.g. I/O device 4). It will be appreciated that the address bus is connected in parallel to a plurality of I/O devices with only one being illustrated as an example in FIG. 1.

When the I/O device 4 has received the address signal and the I/O chip select signal (a first control signal and a second control signal), then it proceeds to effect the I/O operation required. The I/O controller 10 counts the number of I/O clock cycles since the start of the I/O operation (providing the ready signal is not indicating that the I/O device 4 is stalled) and when a predetermined number of clock cycles has occurred it initiates the issue of the grant signal back to the bus controller 8. The number of clock cycles for which the I/O controller waits is determined by the advance controller 14.

If the relative frequencies of the memory clock signal and the I/O clock signal are quite close, then the advance controller 14 can afford to initiate the issue of the grant signal and its resynchronization back to the memory clock signal at a greater time period (number of clock cycles) in advance of the true termination of the operation by the I/O device 4 and still maintain the address signal for a sufficient time than would be the case if the memory clock signal frequency was significantly higher than the I/O clock frequency.

FIG. 2 is a signal timing diagram illustrating the operation of the system of FIG. 1 when the memory clock signal and the I/O clock signal have similar frequencies. The memory clock signal is used to generate a bus clock signal. This has half the frequency of the memory clock signal. The bus clock signal is used internally by the bus controller 8. An I/O request signal is generated by the bus controller 8 in a processing operation synchronized to the bus clock signal. This I/O request signal is passed to the synchronizer 12 of the I/O controller 10 which serves to synchronize this signal to the I/O clock signal to generate a Do I/O signal. The Do I/O signal is used internally by the I/O controller 10 and results in the I/O chip select signal that is passed to the I/O device 4.

The advance controller 14 serves to count the number of I/O clock signal pulses since the start of the Do I/O signal and when a predetermined number of these have passed, as selected by the bits stored within the advance control register 16, then an End I/O signal is issued in synchronism with the I/O clock signal. The End I/O signal triggers the issue of a I/O grant signal that is synchronized back to the bus clock signal by the synchronizer 12. The End I/O signal is actually issued before the end of the Do I/O signal and the I/O chip select signal so that re-synchronization is initiated prior to the end of the I/O cycle. When the I/O grant signal re-synchronized back to the bus clock signal is passed to the bus controller 8, it serves to indicate to the bus controller 8 that the address signal latched upon the address bus lines to the I/O device 4 need no longer be maintained.

FIG. 3 is a signal timing diagram similar to that of FIG. 2, but in this case with a memory clock signal frequency higher than the I/O clock signal frequency. In order to avoid the re-synchronization of the I/O grant signal back to the bus clock signal too early, the End I/O signal is not issued in this case until a sufficient number of I/O clock signal cycles have been completed that the Do I/O signal has finished. Accordingly, the address signal is maintained latched by the bus controller 8 throughout the full I/O cycle for which it is required.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:
   (i) a first circuit responsive to a first clock signal, for asserting a first control signal and a request signal, said first control signal being asserted until said first circuit receives an indication to stop asserting said first control signal;
   (ii) a second circuit responsive to a second clock signal, for asserting a second control signal and a grant signal, said second clock signal being asynchronous to said first clock signal;
   (iii) a third circuit responsive to said first control signal and said second control signal, said request signal being supplied to said second circuit to trigger said second circuit to initiate operation of said third circuit using said second control signal, and said grant signal being supplied to said first circuit to indicate that operation of said third circuit is complete and said first circuit may stop asserting said first control signal;
   (iv) a synchronizer for receiving said request signal from said first circuit and synchronizing said request signal to said second clock signal prior to passing said request signal to said second circuit and for receiving said grant signal from said second circuit and synchronizing said grant signal to said first clock signal prior to passing said grant signal to said first circuit; and
   (v) an advance controller coupled to said second circuit and serving to select one of a plurality of possible times in advance of completion of operation of said third circuit at which said second circuit passes said grant signal to said synchronizer for synchronization to said first clock signal.

2. Apparatus as claimed in claim 1, wherein said first circuit and said second circuit are formed as parts of a single integrated circuit.

3. Apparatus as claimed in claim 2, wherein said integrated circuit includes a central processing unit core circuit.

4. Apparatus as claimed in claim 1, wherein said advance controller includes an advance control register storing one or more advance control bits that control which of said plurality of possible times are selected.

5. Apparatus as claimed in claim 4, wherein said integrated circuit includes a central processing unit core circuit and said advance control bits are set under control of program instructions executing upon said central processing unit core circuit.

6. Apparatus as claimed in claim 1, wherein said third circuit is an input/output device responsive to said second clock signal.

7. Apparatus as claimed in claim 6, wherein said second circuit is an input/output controller circuit, said second control signal is a chip selecting signal and said second clock signal is an input/output clock.

8. Apparatus as claimed in claim 1, wherein said first circuit is a bus controller circuit, said first control signal is an address signal and said first clock signal is a bus clock signal.

9. Apparatus as claimed in claim 1, wherein said first clock signal has a higher frequency than said second clock signal.

10. Apparatus as claimed in claim 9, comprising a fourth circuit responsive to said first clock signal and said first circuit.

11. Apparatus as claimed in claim 10, wherein said fourth circuit is a random access memory circuit.

12. A method of processing data within a system having a first circuit, a second circuit, a third circuit, a synchronizer and an advance controller, said method comprising the steps of:

(i) asserting a first control signal and a request signal with said first circuit, said first circuit being responsive to a first clock signal and said first control signal being asserted until the first circuit receives an indication to stop asserting said first control signal;

(ii) asserting a second control signal and a grant signal with said second circuit, said second circuit being responsive to a second clock signal, said second clock signal being asynchronous to said first clock signal; and (iii) supplying said request signal to said second circuit to trigger said second circuit to initiate operation of said third circuit using said second control signal;

(iv) supplying said grant signal to said first circuit to indicate that operation of said third circuit is complete and said first Circuit may stop asserting said first control signal;

(v) receiving said request signal from said first circuit at said synchronizer and synchronizing said request signal to said second clock signal prior to passing said request signal to said second circuit;

(vi) receiving said grant signal from said second circuit at said synchronizer and synchronizing said grant signal rid said first clock signal prior to passing said grant signal to said first circuit; and (vii) selecting with said advance controller coupled to said second circuit one of a plurality of possible times in advance of completion of operation of said third circuit at which said second circuit passes said grant signal to said synchronizer for synchronization to said first clock signal.

* * * * *